US012644789B2

(12) United States Patent
Maggi et al.

(10) Patent No.: US 12,644,789 B2
(45) Date of Patent: Jun. 2, 2026

(54) PRESSURE SENSOR WITH FLAT FLANGE AND CENTRAL ELEVATED PORTION

(71) Applicant: STMicroelectronics International N.V., Geneva (CH)

(72) Inventors: Luca Maggi, Garlate (IT); Marco Del Sarto, Monza (IT); Alex Gritti, Vimercate (IT)

(73) Assignee: STMicroelectronics International N.V., Geneva (CH)

( * ) Notice: Subject to any disclaimer, the term of this patent is extended or adjusted under 35 U.S.C. 154(b) by 217 days.

(21) Appl. No.: 18/476,114

(22) Filed: Sep. 27, 2023

(65) Prior Publication Data

US 2025/0102391 A1      Mar. 27, 2025

(51) Int. Cl.
| | |
|---|---|
| *G01L 19/14* | (2006.01) |
| *G01L 19/00* | (2006.01) |
| *G01L 19/06* | (2006.01) |

(52) U.S. Cl.
CPC ........ *G01L 19/143* (2013.01); *G01L 19/0069* (2013.01); *G01L 19/0645* (2013.01)

(58) Field of Classification Search
None
See application file for complete search history.

(56) References Cited

U.S. PATENT DOCUMENTS

| | | | |
|---|---|---|---|
| 10,499,822 B2 | 12/2019 | Harvey et al. | |
| 11,397,120 B2 * | 7/2022 | Montgomery, II | ..... G01L 19/06 |

| | | | | |
|---|---|---|---|---|
| 11,561,144 B1 * | 1/2023 | Han | ..................... | G04G 9/0064 |
| 11,839,450 B2 * | 12/2023 | Montgomery, II | .. | A61B 5/4809 |
| 2018/0335360 A1 | 11/2018 | Bentley et al. | | |
| 2019/0161345 A1 | 5/2019 | Brandl et al. | | |
| 2020/0148530 A1 | 5/2020 | Duqi et al. | | |
| 2020/0200634 A1 | 6/2020 | Schiller et al. | | |
| 2022/0348456 A1 | 11/2022 | Dawson et al. | | |
| 2023/0050748 A1 * | 2/2023 | Silvestre | .............. | G01L 9/0044 |
| 2024/0044734 A1 * | 2/2024 | Hu | .......................... | G01K 1/14 |

FOREIGN PATENT DOCUMENTS

| | | | | |
|---|---|---|---|---|
| DE | 102020212123 A1 * | 12/2021 | ......... | G01L 19/0645 |

OTHER PUBLICATIONS

Schröder et al., "Stress-Minimized Packaging of Inertial Sesnors Using Wire Bonding," Transducers 2013, Barcelona, Spain, Jun. 16-20, 2013, pp. 1962-1965.
Fischer et al., "Integrating MEMS and ICs," Microsystems & Nanoengineering (2015) 1, 15005; doi: 10.1038micronano.2015.5, 16 pages.

* cited by examiner

*Primary Examiner* — Peter J Macchiarolo
*Assistant Examiner* — Jermaine L Jenkins
(74) *Attorney, Agent, or Firm* — Seed Intellectual Property Law Group LLP

(57) ABSTRACT

A sensor module includes an organic substrate, a MEMS pressure sensor mounted to the organic substrate, and a unitary lid mounted on the substrate. The unitary lid includes a central elevated portion housing the MEMS pressure sensor, an aperture in the central elevated portion, and a flat flange extending from the central elevated portion to an edge of the organic substrate.

19 Claims, 18 Drawing Sheets

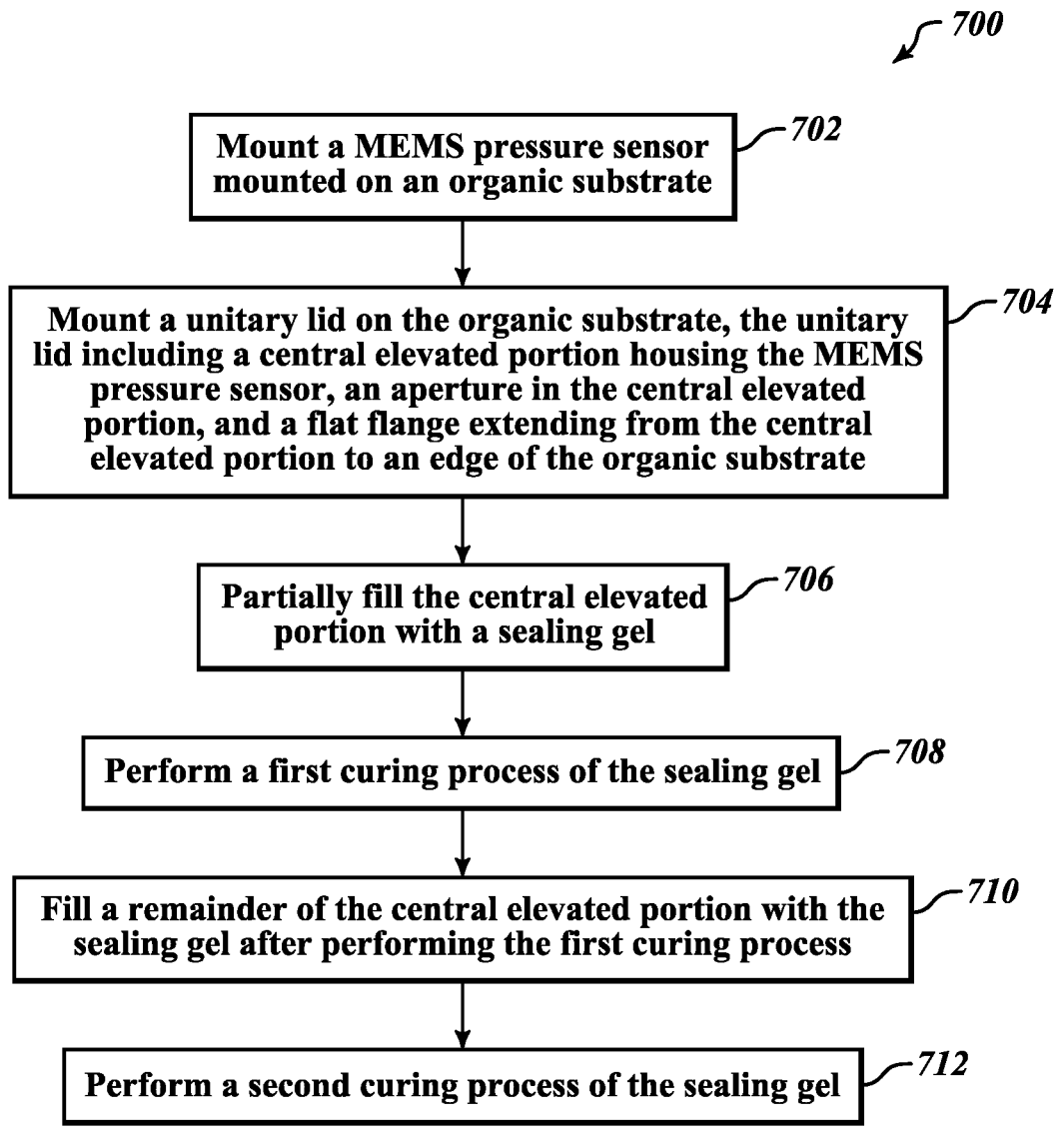

*700*

Mount a MEMS pressure sensor mounted on an organic substrate — *702*

Mount a unitary lid on the organic substrate, the unitary lid including a central elevated portion housing the MEMS pressure sensor, an aperture in the central elevated portion, and a flat flange extending from the central elevated portion to an edge of the organic substrate — *704*

Partially fill the central elevated portion with a sealing gel — *706*

Perform a first curing process of the sealing gel — *708*

Fill a remainder of the central elevated portion with the sealing gel after performing the first curing process — *710*

Perform a second curing process of the sealing gel — *712*

*FIG. 7*

PRESSURE SENSOR WITH FLAT FLANGE AND CENTRAL ELEVATED PORTION

BACKGROUND

Technical Field

The present disclosure relates to MEMS devices mounted within electronic devices, and more particularly to MEMS pressure sensor modules mounted within electronic devices.

Description of the Related Art

Microelectromechanical systems (MEMS) are used in a large variety of applications. MEMS devices are commonly implementing the sensors. For example, MEMS sensors can include accelerometers, gyroscopes, microphones, pressure sensors, and other types of sensors.

In the example of MEMS pressure sensors, it is desirable in many circumstances that the MEMS pressure sensor be waterproof. More particularly, the MEMS pressure sensor may be implemented in a sensor module assembly that is waterproof. Accordingly, the electronic device in which the sensor module is implemented may be submerged in water without damaging the MEMS pressure sensor or circuitry associated with the MEMS pressure sensor.

A waterproof pressure sensor may have a lid. In one possible solution, the housing is shaped so that an O-ring may be placed on the lid. The O-ring assists in ensuring that the pressure sensor is waterproof. However, application of the O-ring may be performed by hand. Moreover, the thickness of certain components of the sensor module may be quite large in order to accommodate the space utilized for the O-ring position. This introduces additional costs and sources of potential malfunction in the manufacturing process.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide a MEMS pressure sensor module that is waterproof without implementation of an O-ring. The MEMS pressure sensor may be coupled to an ASIC on an organic substrate. A lid is placed on the substrate over the MEMS pressure sensor. The lid is a unitary piece having a relatively wide flange. The wide flange is glued to the substrate in a manner that effectively seals and waterproofs the MEMS pressure sensor without the use of an O-ring.

In one embodiment, the unitary lid includes a raised central portion coupled to the flange. When the unitary lid is adhered to the substrate, the MEMS pressure sensor is positioned within the raised central portion. The raised upper portion has a relatively low profile, as space for an O-ring is not utilized. The result is a MEMS pressure sensor module that can effectively provide waterproofing to the MEMS sensor without costly O-ring assembly.

In one embodiment, a sensor module includes a substrate, a MEMS pressure sensor mounted to the substrate, and a unitary lid mounted on the substrate. The unitary lid includes a central elevated portion housing the MEMS pressure sensor, an aperture in the central elevated portion, and a flat flange extending from the central elevated portion to an edge of the substrate.

In one embodiment, a method includes mounting a MEMS pressure sensor on a substrate and mounting a unitary lid on the substrate. The unitary lid includes a central elevated portion housing the MEMS pressure sensor, an aperture in the central elevated portion, and a flat flange extending from the central elevated portion to an edge of the substrate. The method includes partially filling the central elevated portion with a sealing gel, performing a first curing process of the sealing gel, filling a remainder of the central elevated portion with the sealing gel after performing the first curing process, and performing a second curing process of the sealing gel.

In one embodiment, a method includes generating, with a MEMS pressure sensor coupled to a substrate, analog pressure signals, receiving, with an ASIC electrically coupled to the MEMS pressure sensor, digital pressure signals based on the analog pressure signals, and passing the digital pressure signals to a control circuit of an electronic device. The MEMS pressure sensor and the ASIC are positioned within a central elevated portion of a unitary lid mounted on the substrate and including an aperture in the central elevated portion and a flat flange extending from the central elevated portion to an edge of the substrate.

BRIEF DESCRIPTION OF THE SEVERAL VIEWS OF THE DRAWINGS

FIG. 7 is a flow diagram of a method for assembling a sensor module, in accordance with one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
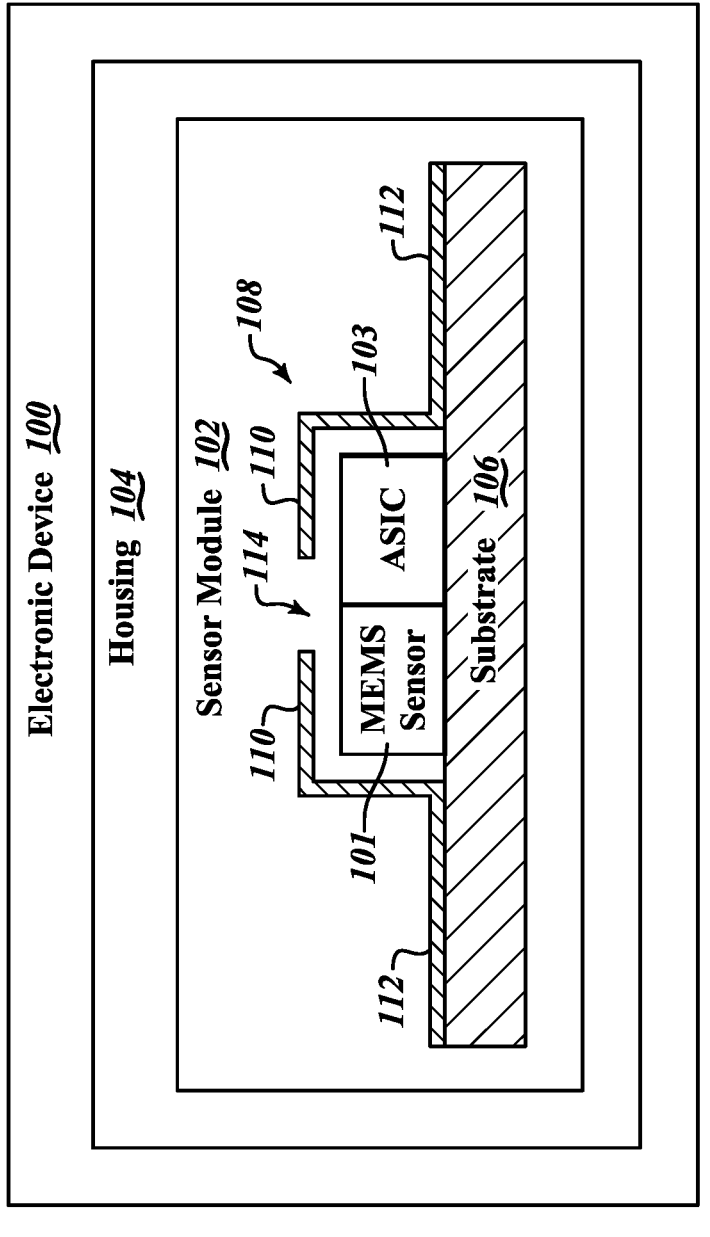
FIG. 1 is a block diagram of an electronic device, in accordance with one embodiment.

FIG. 1 is a block diagram of an electronic device 100, in accordance with one embodiment. The electronic device 100 includes a sensor module 102 coupled within a housing 104 of the electronic device 100. As will be set forth in more detail below, the configuration of the sensor module provides an effective and efficient waterproofed MEMS sensor.

The sensor module 102 includes a MEMS sensor 101 and an ASIC 103 coupled to a substrate 106. The MEMS sensor 101 is a MEMS pressure sensor. The MEMS pressure sensor 101 can generate sensor signals indicative of air pressure, water pressure, or other types of pressure.

The MEMS pressure sensor can be implemented in a semiconductor die. The semiconductor die can undergo various semiconductor processes to pattern and form the components of a pressure sensor from the semiconductor die. The semiconductor processes can also provide circuit components within the semiconductor die that assist in the generation and transmission of sensor signals indicative of the pressure being sensed.

In one embodiment, the MEMS pressure sensor 101 includes a flexible layer that acts as a diaphragm. Fluid pressure in the environment of the MEMS sensor causes the diaphragm to deflect, bend, or otherwise move. The displacement of the diaphragm can be sensed. The displacement of the diaphragm can be correlated to the fluid pressure in the environment of the MEMS pressure sensor 101.

In one embodiment, the MEMS pressure sensor 101 is a capacitive sensor. In one example, electrodes are formed on the diaphragm and on a substrate or surface separated from the diaphragm by a cavity. The capacitance between the electrodes changes based on the distance between the electrodes. Accordingly, displacement of the diaphragm is sensed as a change in capacitance.

In one embodiment, the MEMS pressure sensor 101, is a piezoresistive pressure sensor. Piezoresistive elements may be formed directly on the diaphragm or coupled to the diaphragm in a manner that causes flexion or movements of the piezoresistive elements. Displacement of the diaphragm causes the piezoresistive elements to flex or strain. The flexion or strain of the piezoresistive elements result in a change in resistance of the piezoresistive elements. Accordingly, the resistance of the piezoresistive elements can be utilized to determine the fluid pressure in the environment of the MEMS pressure sensor 101. Other types of MEMS pressure sensors can be utilized without departing from the scope of the present disclosure.

The ASIC 103 is an application specific integrated circuit. The ASIC 103 can include analog to digital circuitry that receives analog sensor signals from the MEMS pressure sensor 101 and generates digital sensor signals indicative of the pressure sensed by the MEMS pressure sensor 101.

The analog circuitry of the ASIC 103 can include an analog-to-digital converter (ADC). The ADC can receive the analog pressure signals and can perform an analog-to-digital conversion to convert the analog pressure signals to digital signals. The analog circuitry of the ASIC may include other types of circuitry that can condition or transform signals received directly from the MEMS sensor 101.

The digital circuitry of the ASIC 103 can receive the digital sensor signals from the analog circuitry and can process or condition the digital sensor signals. The digital circuitry can include digital filters, demodulators, digital signal processing circuitry, control circuitry, or other types of circuitry for processing the digital signals.

The ASIC 103 can be implemented in a separate integrated circuit die from the MEMS sensor 101. In this case, the MEMS sensor 101 may be electrically coupled to the ASIC 103 by coupling circuitry. The coupling circuitry can include one or more of wire bonds, solder bumps, contact pads, signal traces, or other types of coupling circuitry.

In one embodiment, the ASIC 103 and the MEMS sensor 101 are implemented in a same integrated circuit die. In this case, the sensor signals from the MEMS sensor 101 are provided to the ASIC 103 by metal interconnect lines and conductive vias embedded within the integrated circuit die. The ASIC 103 and the MEMS sensor 101 may be implemented in a system on-chip.

In one embodiment, the substrate 106 is an organic substrate. The organic substrate can include signal traces or buried signal lines that are electrically coupled to the ASIC 103. The electrical coupling can be accomplished by solder bumps, wire bonding, or other types of electrical connection. Power can be provided to the ASIC 103 via the signal traces and signal lines. The digital sensor data can be output from the ASIC to other components of the electronic device 100 via the signal lines and signal traces in the substrate 106. The substrate 106 can include a printed circuit board or other type of substrate without departing from the scope of the present disclosure. In one embodiment, the substrate 106 is a ceramic substrate.

The sensor module 102 includes a unitary lid 108 coupled to the substrate 106. The unitary lid 108 is a single integral piece that is coupled to the substrate 106. The unitary lid 108 can include stainless steel, aluminum, titanium, or other types of metals. Alternatively, the unitary lid 108 can include plastic or other types of material.

The unitary lid 108 includes an elevated central housing 110. The elevated central housing 110 is positioned over the MEMS sensor 101 and the ASIC 103. The elevated central housing 110 includes an aperture 114 by which pressure can be applied to the MEMS sensor 101.

The unitary lid 108 includes a flattened flange 112. The flattened flange 112 is directly coupled to the substrate 106. The flattened flange 112 is relatively wide. The flat flange 112 extends to the edge of the substrate 106, or nearly to an edge of the substrate 106. Because the flange 112 covers a relatively large surface area, the flange 112 can be glued to the substrate 106 in a manner that waterproofs the MEMS sensor 101 and the ASIC 103. As will be set forth in more detail below, a sealing gel fills the race central housing 110 to further waterproof the MEMS sensor 101 and the ASIC 103.

Because the wide flange 112 effectively seals the sensor module 112 in a waterproof manner, the height of the elevated portion 110 can be relatively low. This is because the wide flange 112 makes it so waterproofing can be accomplished without placing an O-ring around the raised elevated portion 110. If an O-ring is not to be utilized, then the height of the elevated central portion can be reduced. The result is a thinner sensor module 102. Furthermore, because an O-ring is not utilized in the waterproofing, a potentially expensive and malfunction prone aspect of manufacture can be removed.

The sensor module 102 is coupled to a housing 104 of the electronic device 100. The housing can be glued to a top surface of the flange 112 or otherwise coupled to the sensor module 102.

The electronic device 100 can include a wearable electronic device such as a smart watch, smart glasses, a mobile phone, or other types of electronic devices. Alternatively, the electronic device 100 can include an industrial machine, a vehicle, or other types of electronic devices that may benefit from implementation of a sensor module 102 within the electronic device 100.

Figure 2A:
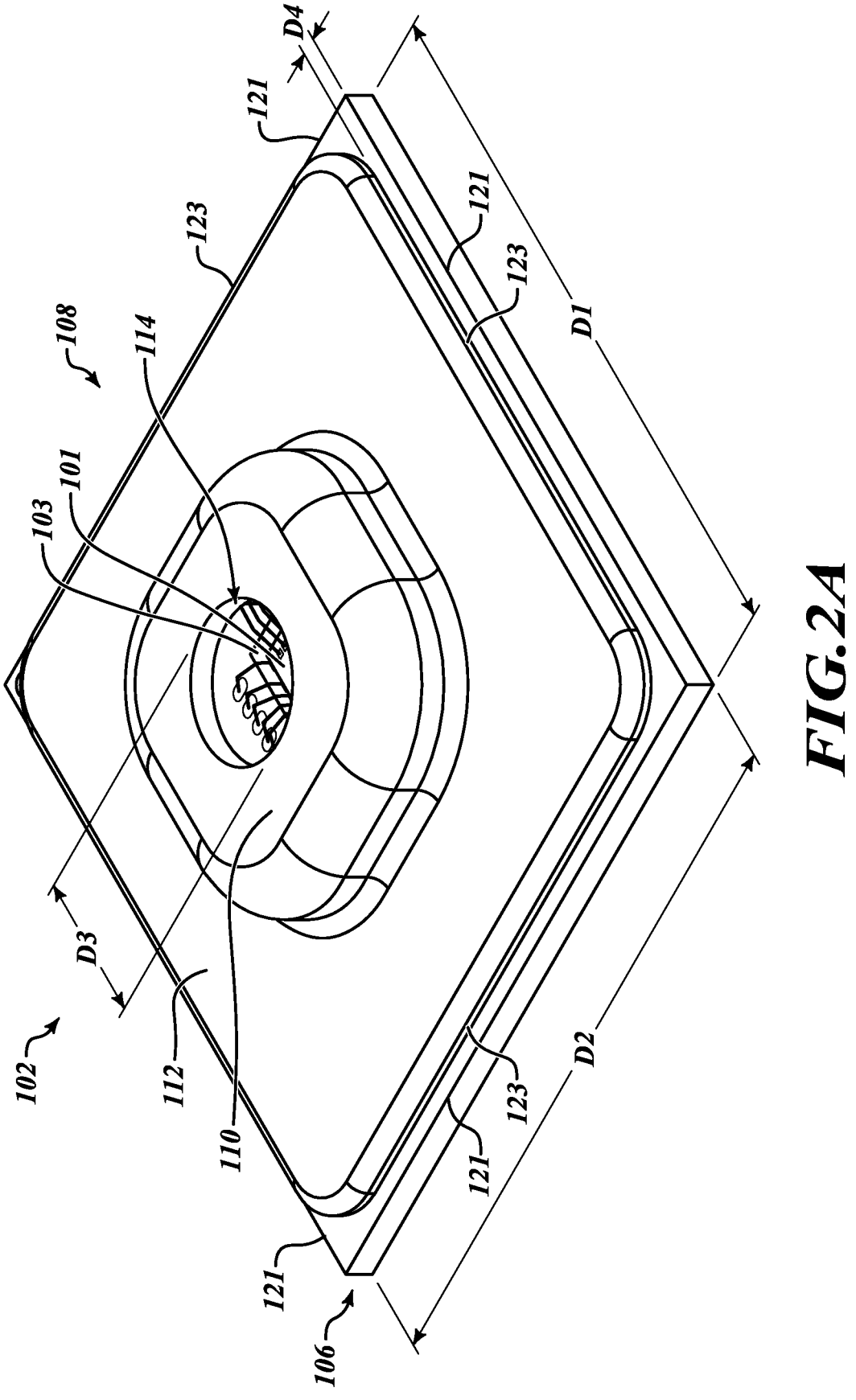
FIG. 2A is a perspective view of a sensor module including a MEMS pressure sensor, in accordance with one embodiment.

FIG. 2A is a perspective view of a sensor module 102, in accordance with some embodiments. The sensor module 102 of FIG. 2A is one example of a sensor module 102 of FIG. 1. The sensor module 102 includes a substrate 106. In the example FIG. 2A, the substrate 106 is rectangular and has a first lateral dimension D1 and a second lateral dimension D2. The lateral dimension D1 may be equal to the lateral dimension D2 such that the organic substrate 106 is substantially a square shape. Alternatively, the lateral dimension D1 can be different than a lateral dimension D2 depending on device specifications. In one embodiment, the lateral dimensions D1 and D2 are between 3.5 mm and 8 mm, though other dimensions can be utilized without departing from the scope of the present disclosure. The substrate 106 includes lateral edges 121.

The sensor module 102 includes a unitary lid 108. The unitary lid 108 includes a raised central housing 110 and the flange 112. The race central housing 110 is positioned over a MEMS pressure sensor 101 and an ASIC 103 mounted on the substrate 106.

The raised central housing 110 has an aperture 114. The aperture 114 has a diameter dimension D3. The dimension D3 can be less than 1 mm, though other dimensions can be utilized without departing from the scope of the present disclosure. The raised central housing 110 also has a height dimension that will be described further below.

The unitary lid 108 includes a flat flange 112 that extends from the race central portion 110 to the edges of the substrate 106. The flat flange 112 has lateral edges 123. When the lid is mounted to the substrate 106, the lateral edges 123 of the flange 112 are very close to the lateral edges 121. The width dimension of the flange 112 may be substantially identical to the width dimension of the substrate 106. Alternatively, the width dimensions of the flange 112 may be slightly less than the width dimensions of the substrate 106 such that a lateral separation dimension D4 exists between the edge 123 of the flange 112 and the edge 121 of the substrate 106 when the lid 108 is mounted on the substrate 106. The dimension D4 may be between 0.1 mm and 0.3 mm, though other dimensions may be utilized without departing from the scope of the present disclosure. The relatively large width of the flange 112 helps ensure waterproofing of the sensor module 102.

Figure 2B:
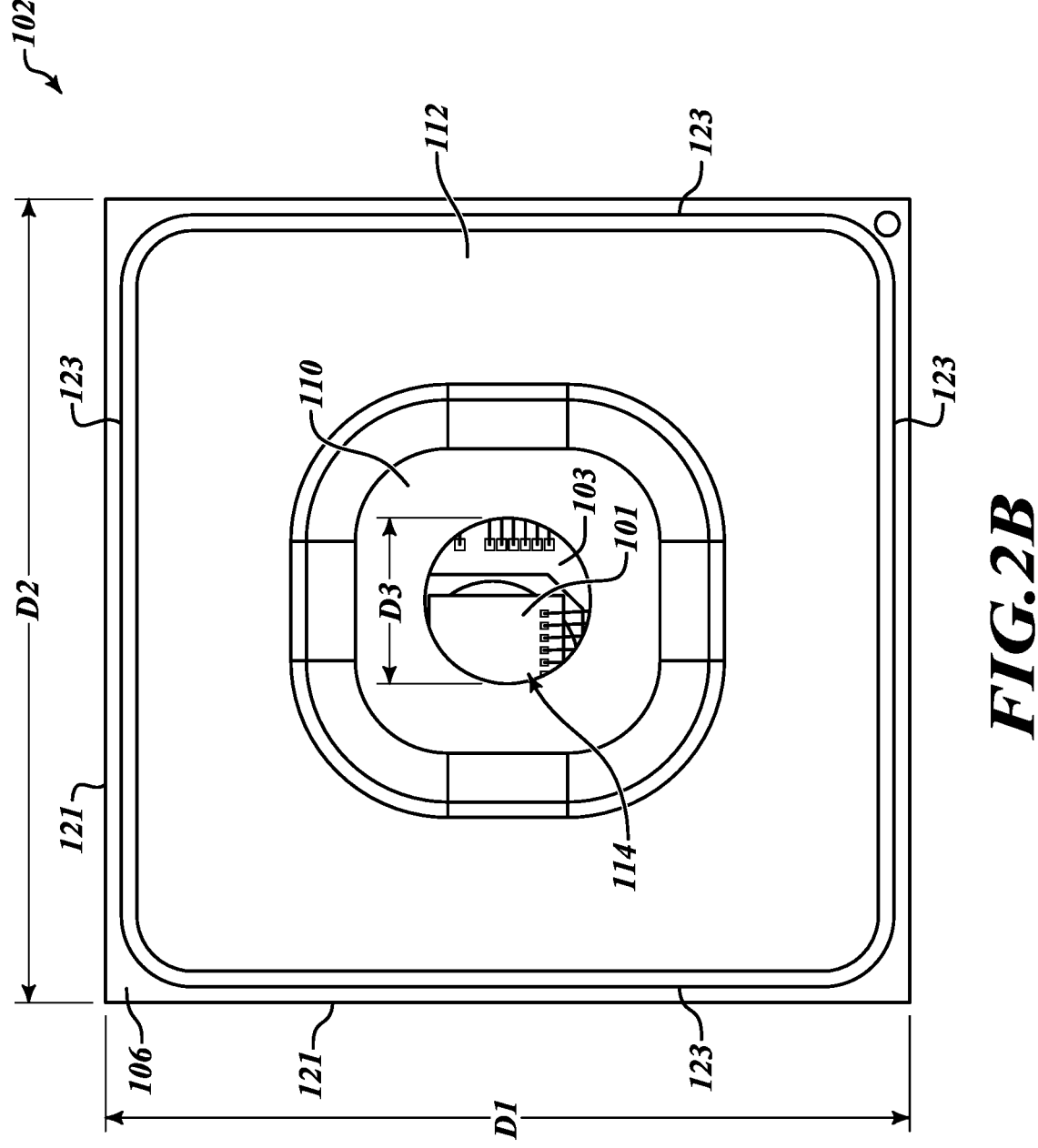
FIG. 2B is a top view of the sensor module of FIG. 2A, in accordance with one embodiment.

FIG. 2B is a top view of the sensor module 102 of FIG. 2A, according to one embodiment. The top view of FIG. 2A further illustrates the relative shape emplacements of the substrate 106 and the flange 112. Furthermore, the top view of FIG. 2B illustrates that the flange 112 has rounded corners. Furthermore, the race central housing 110 has rounded corners as well. Alternatively, one or both of the flange 112 and the race central housing 110 can have sharp corners. Although a rectangular substrate 106 and lid 108 have been illustrated, in practice, other shapes can be utilized. For example, the substrate 106 and the lid 108 can have a circular shape, an elliptical shape, or other shapes without departing from the scope of the present disclosure.

Figure 2C:
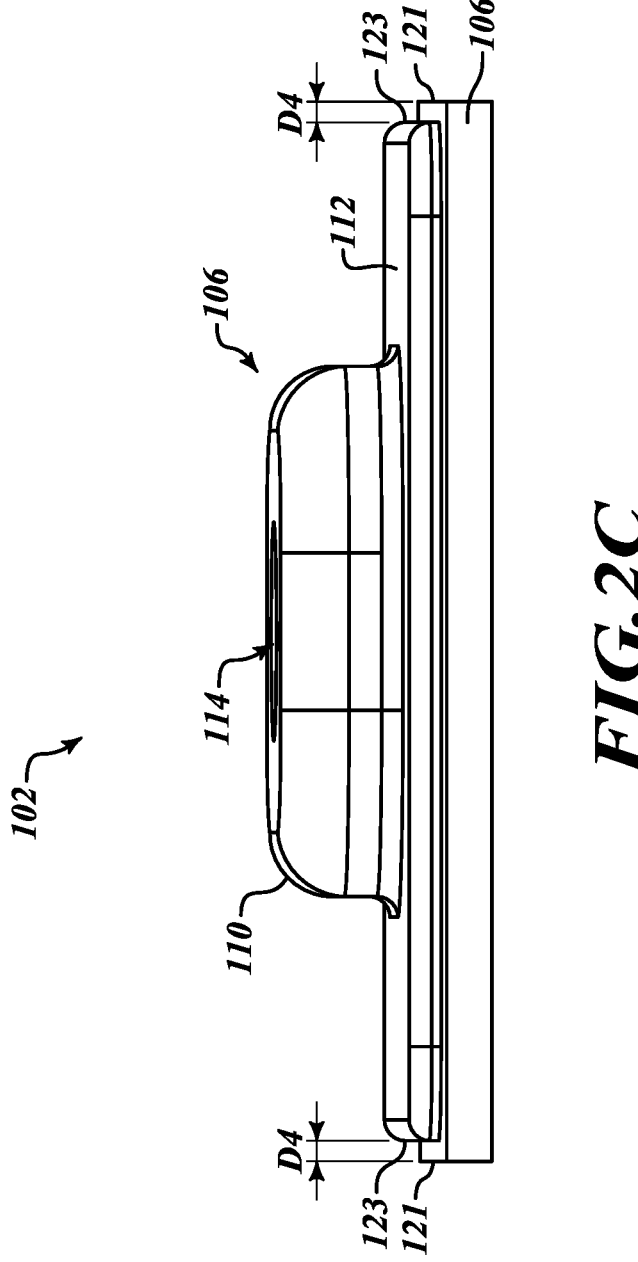
FIG. 2C is a side view of the sensor module of FIG. 2A, in accordance with one embodiment.

FIG. 2C is a side view of the sensor module 102 of FIG. 2A, in accordance with one embodiment. The side view of FIG. 2C illustrates the curved nature of the elevated central housing 110 and the flat nature of the flange 112. The flange 112 has a substantially flat bottom surface. In one embodiment, the total height of the elevated central housing above the substrate 106 is between 1 mm and 2 mm, though other heights can be utilized without departing from the scope of the present disclosure.

In one embodiment, the width of the flange 112 from edge to edge is at least twice as large as the height of the raised central housing 110. In one embodiment, the width of the flange 112 is more than three times as large as the height of the race central housing 110. The relatively large width of the flange helps ensure waterproofing without utilization of an O-ring. Other ratios of width and height can be utilized without departing from the scope of the present disclosure.

Figure 3A:
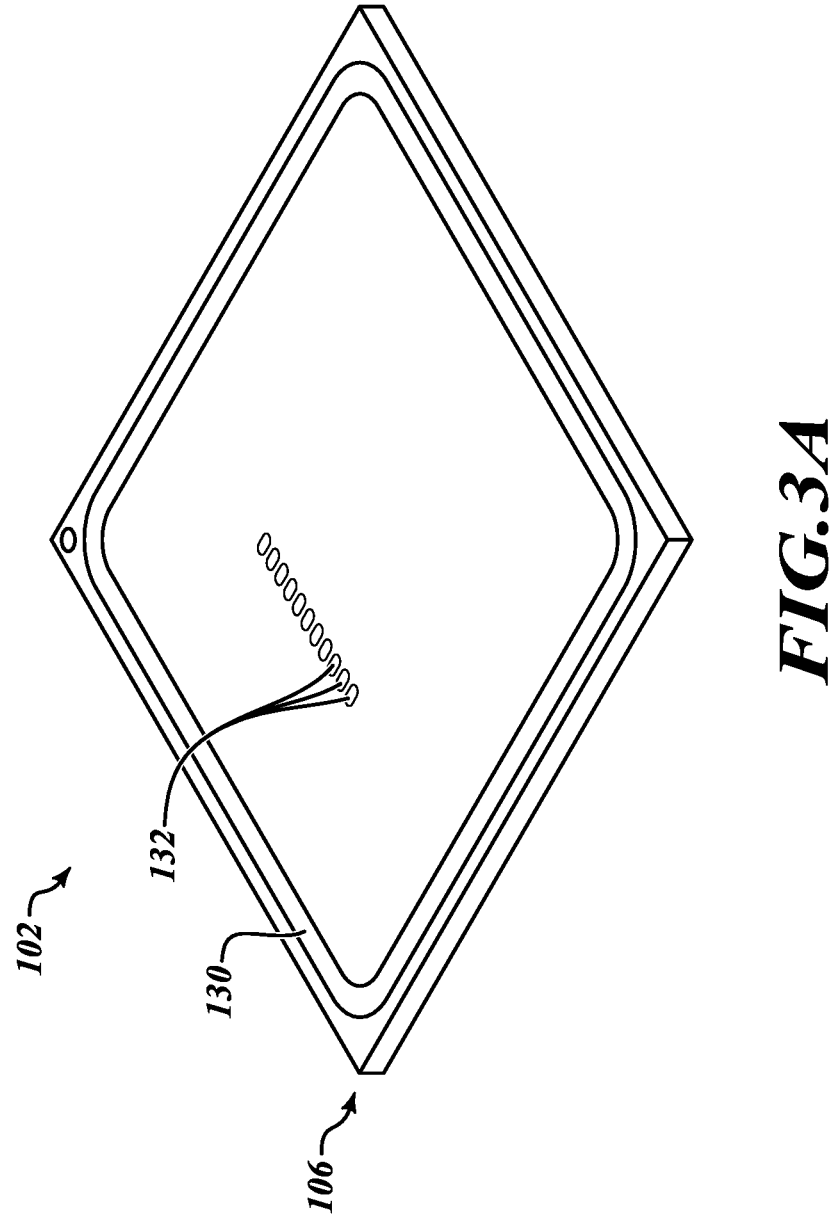
FIG. 3A is a perspective view of a sensor module at an intermediate stage of manufacture and including an organic substrate, in accordance with one embodiment.

FIG. 3A is a perspective view of a sensor module 102 and an intermediate stage of assembly, in accordance with some embodiments. In FIG. 3A, the substrate 106 is present. A strip of glue 130 is positioned adjacent to the edges of the substrate 106. As will be set forth in more detail below, the glue will be utilized for mounting the lid 108 to the substrate 106. The substrate 106 includes electrical connectors 132.

Figure 3B:
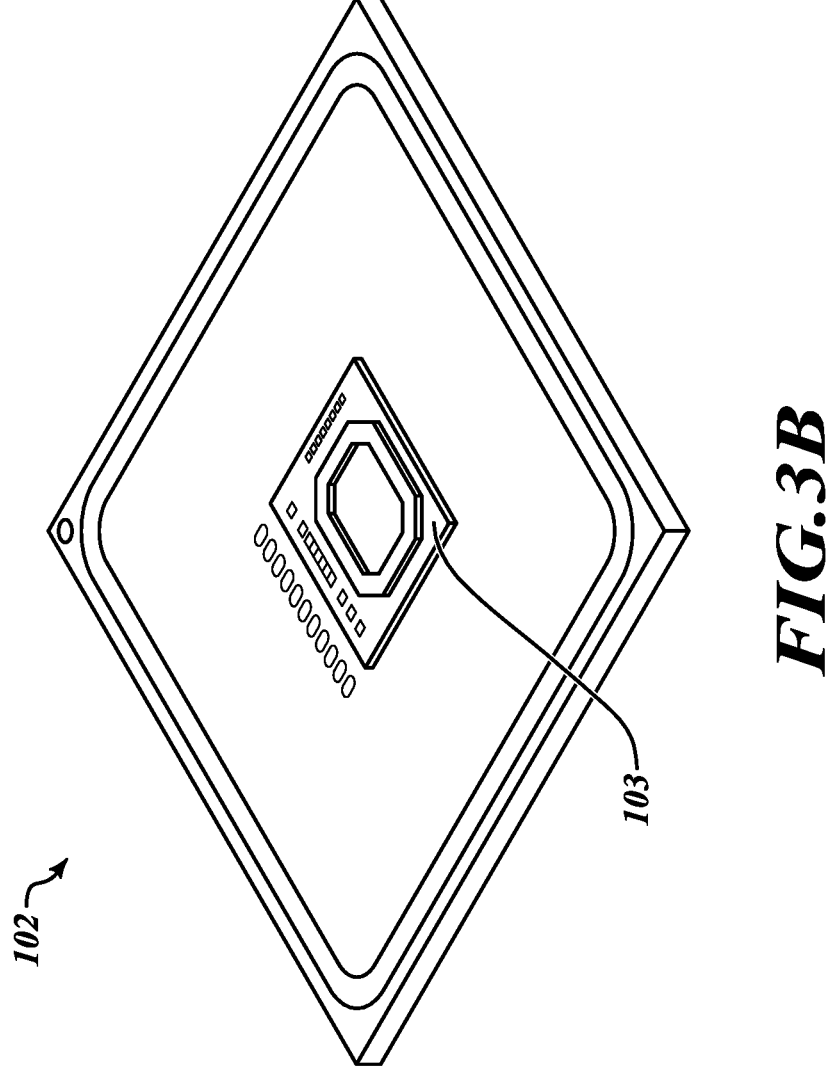
FIG. 3B is a perspective view of the sensor module of FIG. 3A with an ASIC mounted to the organic substrate, in accordance with one embodiment.

In FIG. 3B, the ASIC 103 has been mounted to the substrate 106 adjacent to the electrical connectors 132. The ASIC 103 can include leads, contact pads, or other types of connectors can be utilized to electrically couple the ASIC 103 to the electrical connectors 132.

Figure 3C:
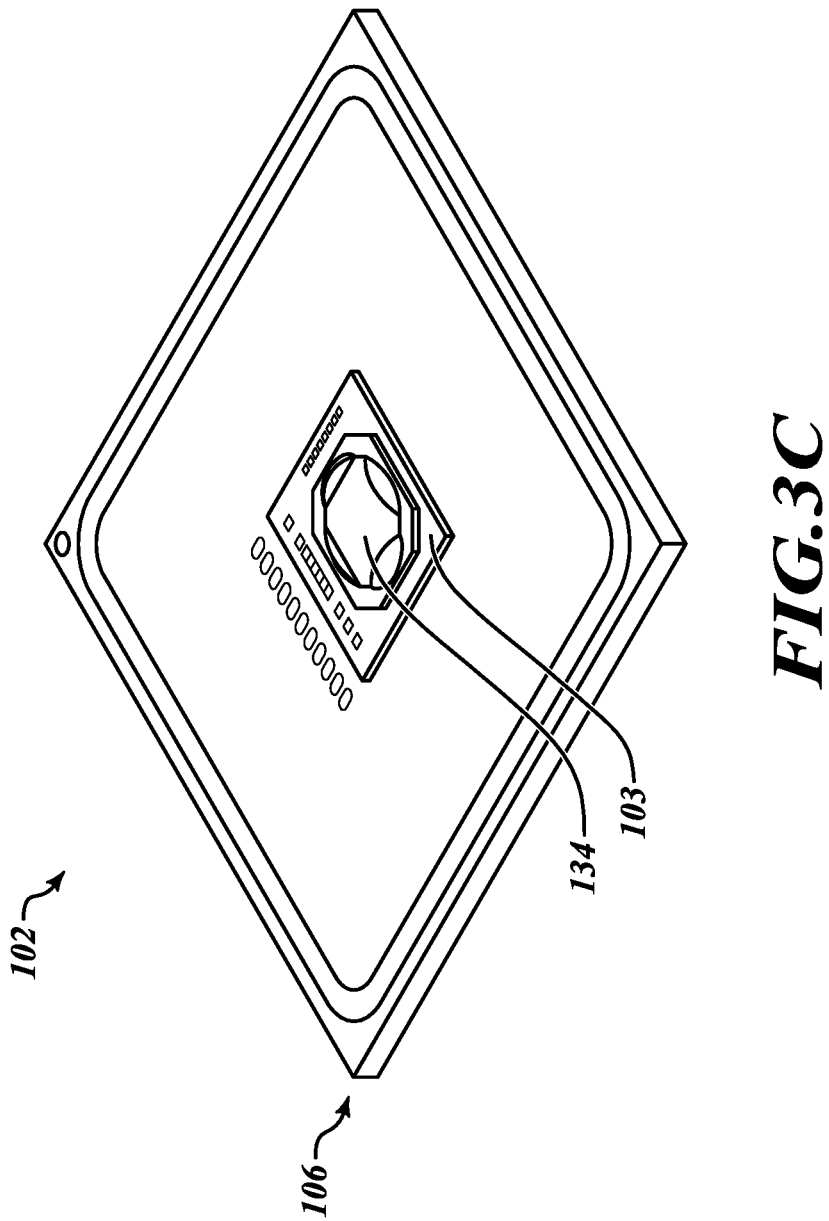
FIG. 3C is a perspective view of the sensor module of FIG. 3B with glue applied to the ASIC, in accordance with one embodiment.

In FIG. 3C, a mounting glue 134 has been applied to the top surface of the ASIC 103. The mounting will be utilized for hearing the MEMS pressure sensor 101 to the ASIC 103. Alternatively, the mounting glue 134 can be placed on the substrate 106 such that the MEMS pressure sensor 101 can be mounted directly to the substrate 106.

Figure 3D:
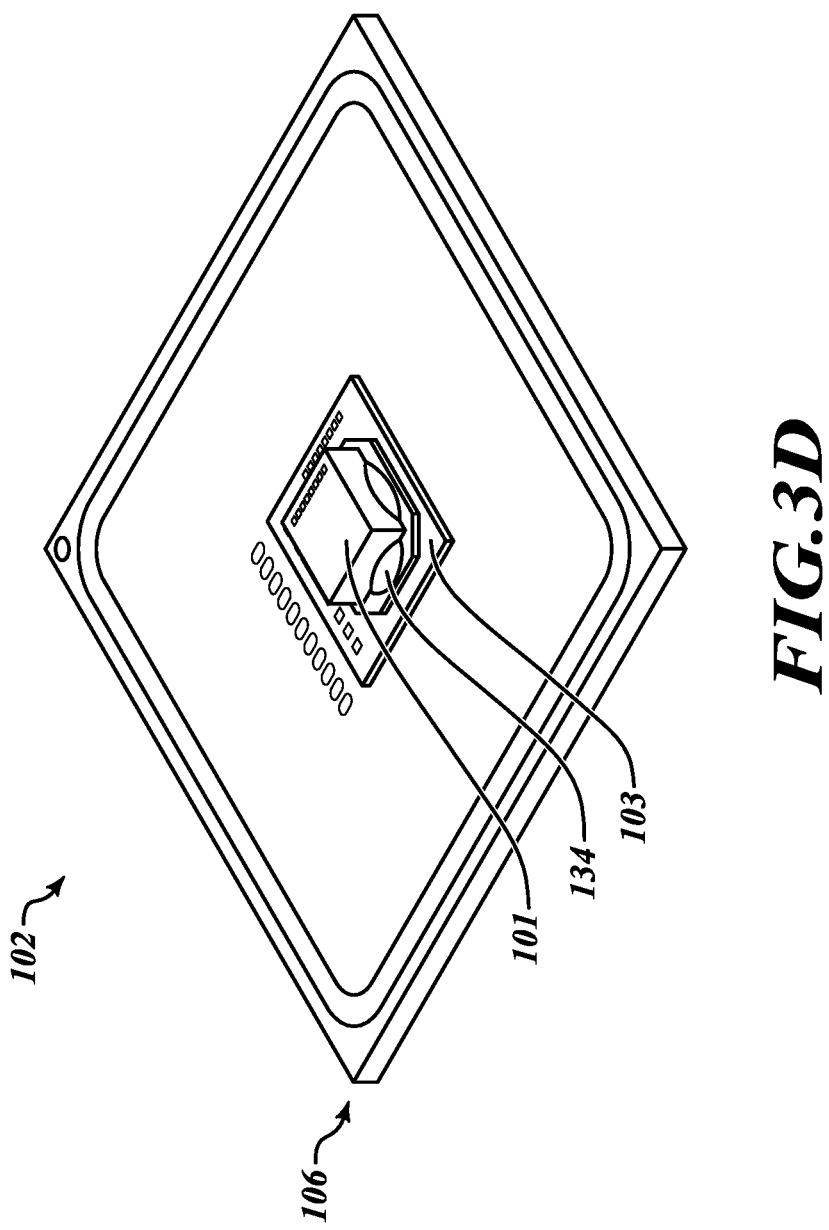
FIG. 3D is a perspective view of the sensor module of FIG. 3C with a MEMS pressure sensor mounted to the ASIC by the glue, in accordance with one embodiment.

In FIG. 3D, the MEMS sensor 101 has been mounted to the ASIC 103. In particular, the MEMS sensor 101 has been placed on the glue 134 to adhere the MEMS sensor 101 to the ASIC 103. The MEMS sensor 101 is mounted to the substrate 106 by mounting the MEMS sensor 101 to the ASIC 103 that is mounted to the substrate 106.

Figure 3E:
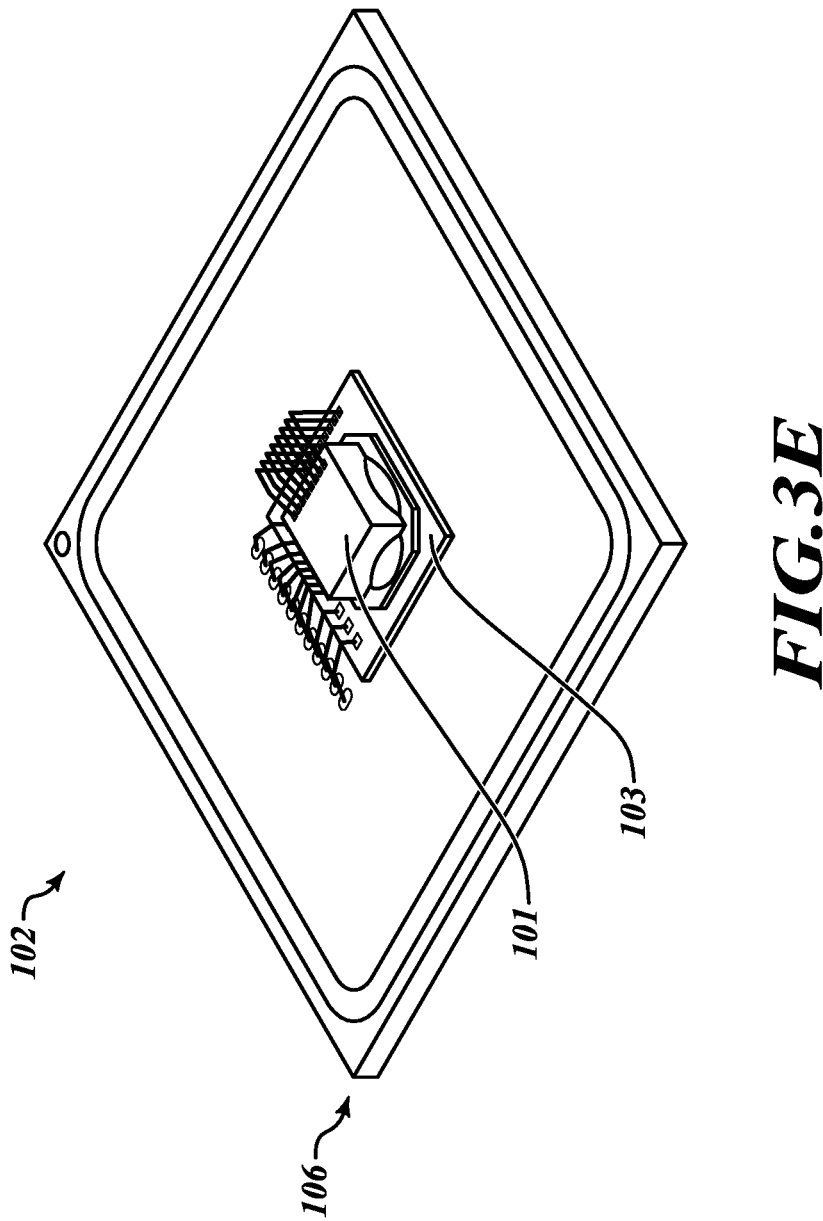
FIG. 3E is a perspective view of the sensor module of FIG. 3D, with wire bonding electrically coupling the MEMS pressure sensor to the ASIC and the ASIC to the organic substrate, in accordance with one embodiment.

In FIG. 3E, a wire bonding processes been performed. Wire bonds extend between electrical connectors (e.g. contact pads) of the MEMS sensor 101 and electrical connectors of the ASIC 103. In this way, the MEMS sensor 101 is electrically coupled to the ASIC 103 such that sensor signals can be passed from the MEMS sensor 101 to the ASIC 103. Wire bonds extend from electrical connectors on the ASIC 103 to the electrical connectors 132 of the substrate 106. Other types of electrical connectors can be utilized without departing from the scope of the present disclosure.

Figure 3F:
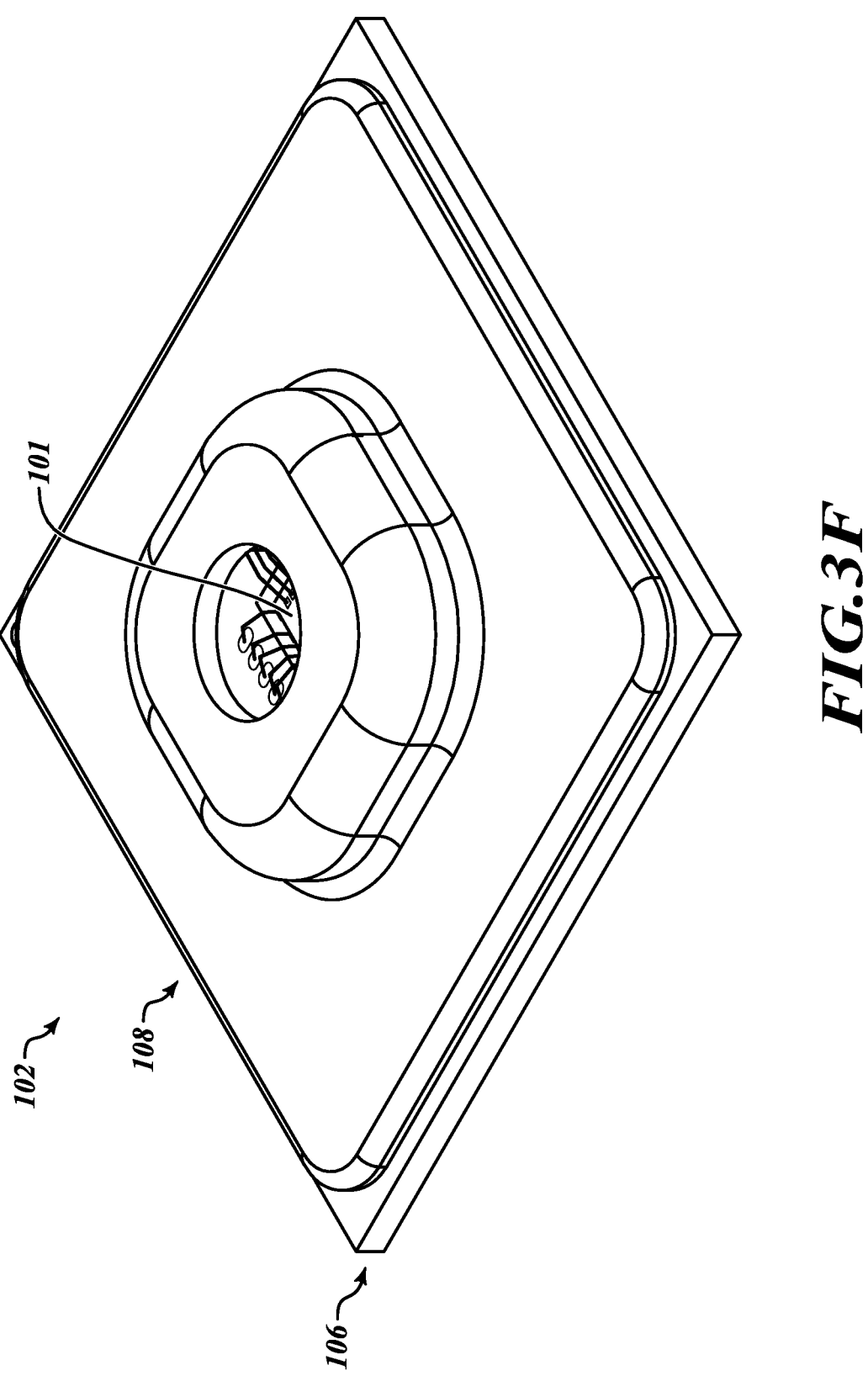
FIG. 3F is a perspective view of the sensor module of FIG. 3E with a unitary lid mounted to the organic substrate, in accordance with one embodiment.

In FIG. 3F, the unitary lid 108 has been mounted to the substrate 106. In particular, the bottom surface of the flange 112 has been mounted to the top surface of the substrate 106 via the glue 130.

Figure 3G:
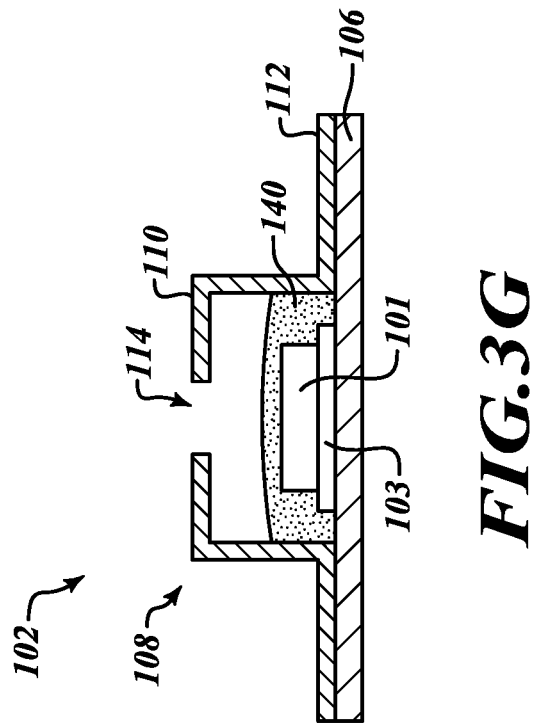
FIG. 3G is a side sectional view of a sensor module after application of a first portion of a sealing gel, in accordance with one embodiment.

FIG. 3G is a simplified cross-sectional view of a sensor module 102 after the stage of processing shown in FIG. 3F, in accordance with one embodiment. In FIG. 3G, a sealing gel 140 has been placed in the raised central housing 110. The sealing gel 140 only partially fills the race central housing 110. An annealing or curing process is then performed to cure the sealing gel 140. This part of a waterproofing process.

Figure 3H:
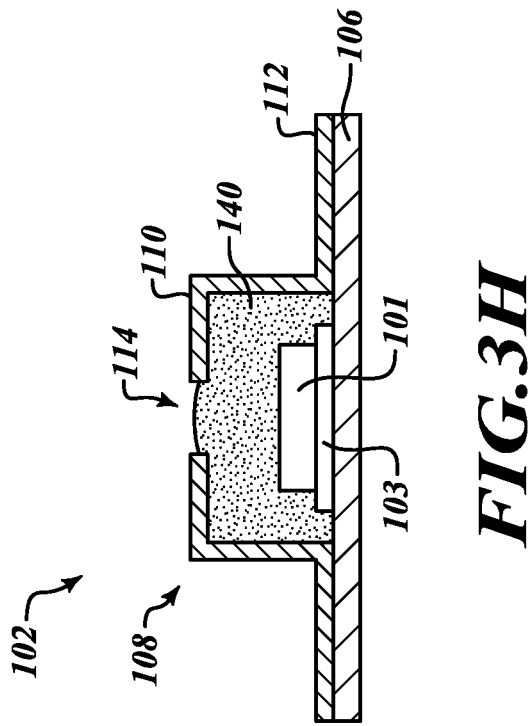
FIG. 3H is a side sectional view of the sensor module of FIG. 3G after application of a second portion of the sealing gel, in accordance with one embodiment.

In FIG. 3H, a second dose of sealing gel 140 has been placed in the raised central housing 110. The second dose of sealing gel 140 fills the remainder of the race central housing 110. An annealing or curing process is then performed. Waterproofing of the sensor module 102 is now complete. The application in curing of the sealing gel in two separate application steps is highly beneficial. In particular, this process results in either complete or nearly complete lack of air bubbles within the race central housing 110. The presence of air bubbles in the race central housing 110 can be problematic.

The MEMS pressure sensor 101 census pressure via the sealing gel 140. In particular, the fluid pressure causes flexion of the sealing gel 140, which further causes deflection the diaphragm (or other mechanism) within the MEMS sensor 101. Accordingly, the gel 140 waterproof the MEMS sensor 101 while still enabling the MEMS sensor 101 to sense pressure. Other configurations of a sensor module 102 can be utilized without departing from the scope of the present disclosure.

Figure 3I:
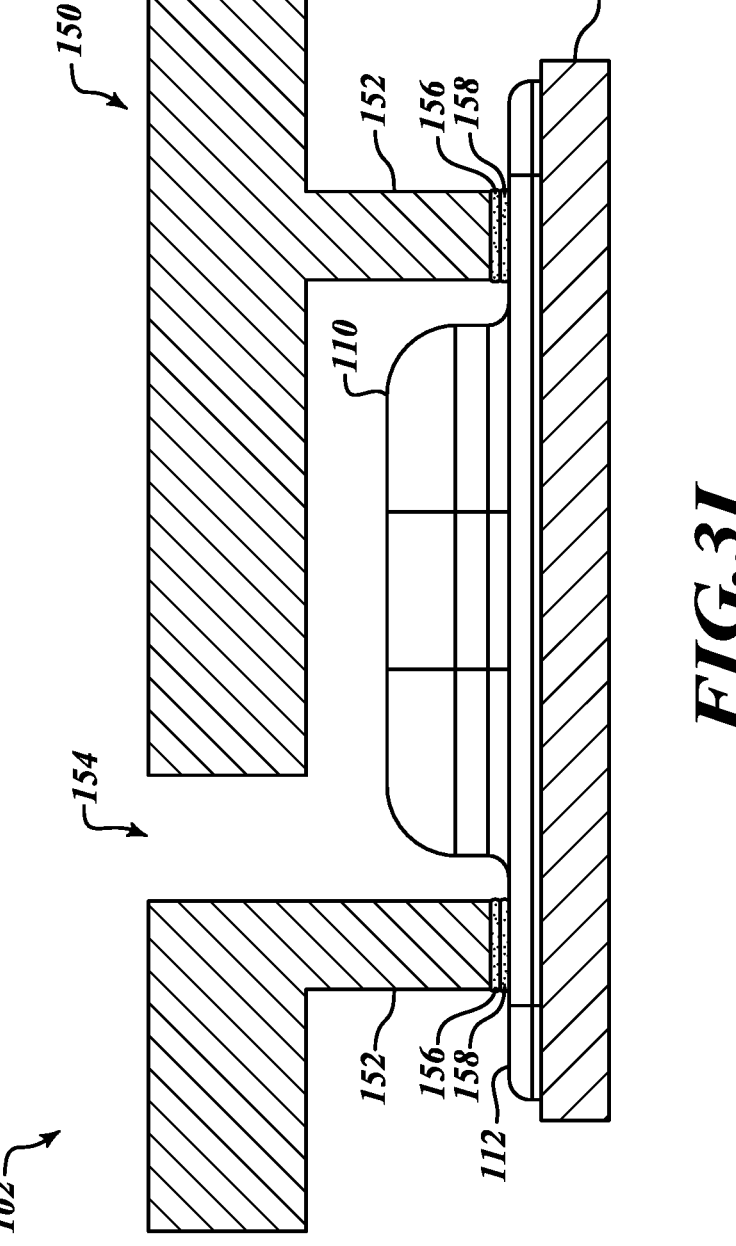
FIG. 3I is a side view of a sensor module within housing coupled to the unitary lid, in accordance with one embodiment.

FIG. 3I is a side view of a sensor module 102, in accordance with one embodiment. In FIG. 3I, a housing 150 of the electronic device 100 has been mounted to the flange 112 of the lid 108. The flange 112 may include grooves or scoring 158 on the top surface of the flange 112. The housing 150 is then mounted to the lid by fixing leg portions 152 on the grooves 158 via a glue 156. The housing 150 includes an aperture 154 that allows fluid communication with the MEMS sensor 101. Other configurations of a housing can be utilized without departing from the scope of the present disclosure.

Figure 4:
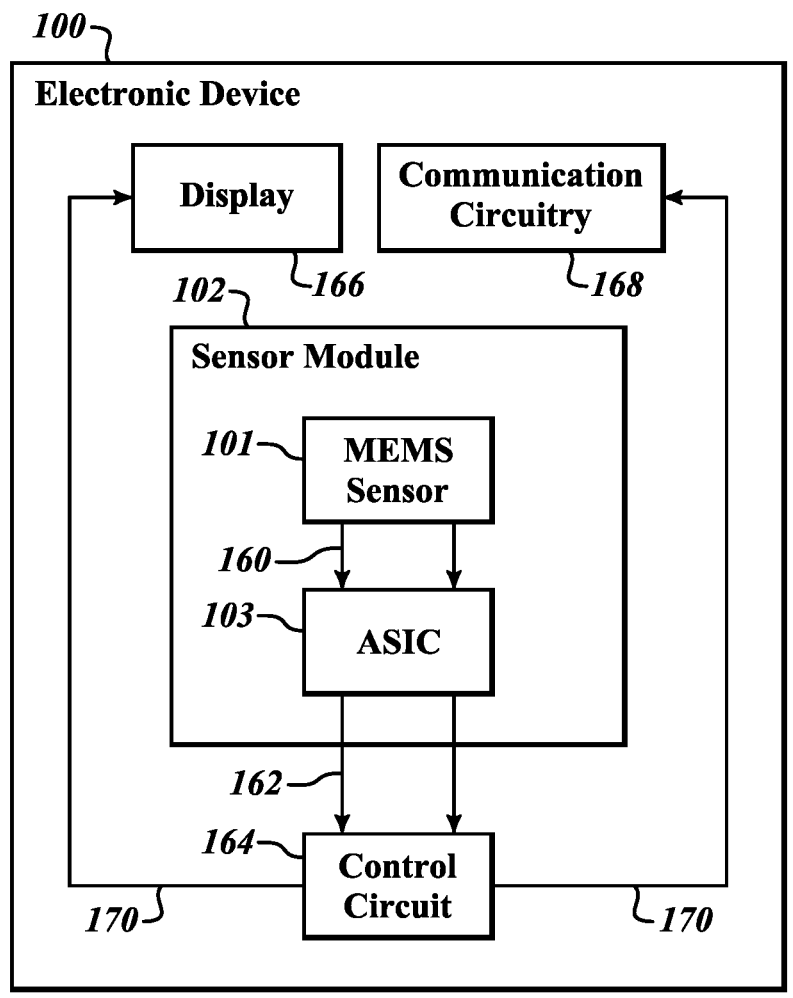
FIG. 4 is a block diagram of an electronic device including a sensor module, in accordance with one embodiment.

FIG. 4 is a block diagram of an electronic device 100, in accordance with one embodiment. The view of FIG. 4 illustrates the generation and passing of signals within the electronic device 100. The electronic device 100 a control circuit 164, a display 166 and communication circuitry 168.

The MEMS sensor 101 generates sensor signals 160 and passes them to the ASIC 103, as described previously. The ASIC 103 receives the sensor signals 160 and generates digital sensor signals 162 by processing and conditioning the sensor signals 160, as described previously. The ASIC 103 passes the sensor signals 162 to the control circuit 164. The control circuit 164 can correspond to one or more processors of the electronic device 100 not mounted on the substrate 106. The ASIC 103 may also include a controller processor. The control circuit 164 receives the digital sensor data 162 and may store or process the digital sensor data 162 and provide data 170 to the display 166 or to the communication circuitry 168. The display 166 may display data associated with the pressure signals to the user. Communication circuitry 168 can include wired or wireless communication circuitry that enables wired or wireless transmission of the data 172 external devices.

Figure 5:
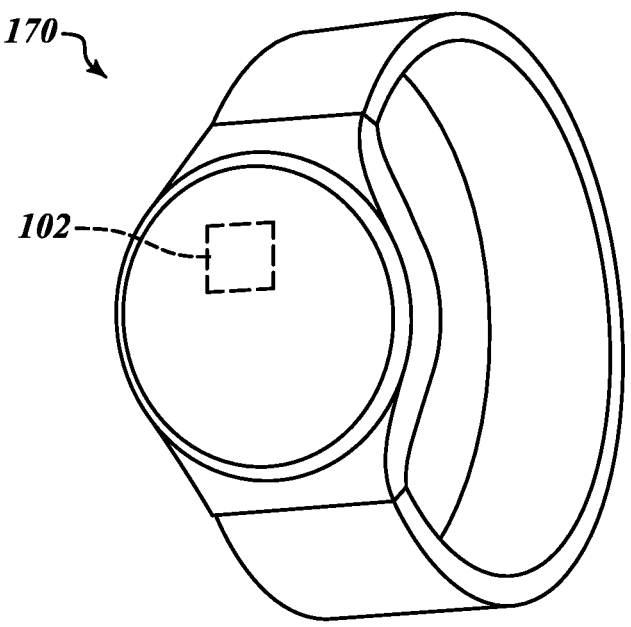
FIG. 5 is an illustration of a smartwatch including a sensor module, in accordance with one embodiment.

FIG. 5 is an illustration of a smartwatch 170, in accordance with one embodiment. The smartwatch 170 is one example of an electronic device 100 of FIG. 1 or FIG. 4. A sensor module 102, shown in dashed lines, is mounted within the smartwatch 170. The sensor module 102 may be positioned at a location that enables fluid communication such that the sensor module 102 can sense fluid pressure. The sensor module 102 can correspond to the sensor module shown in previous figures.

Figure 6:
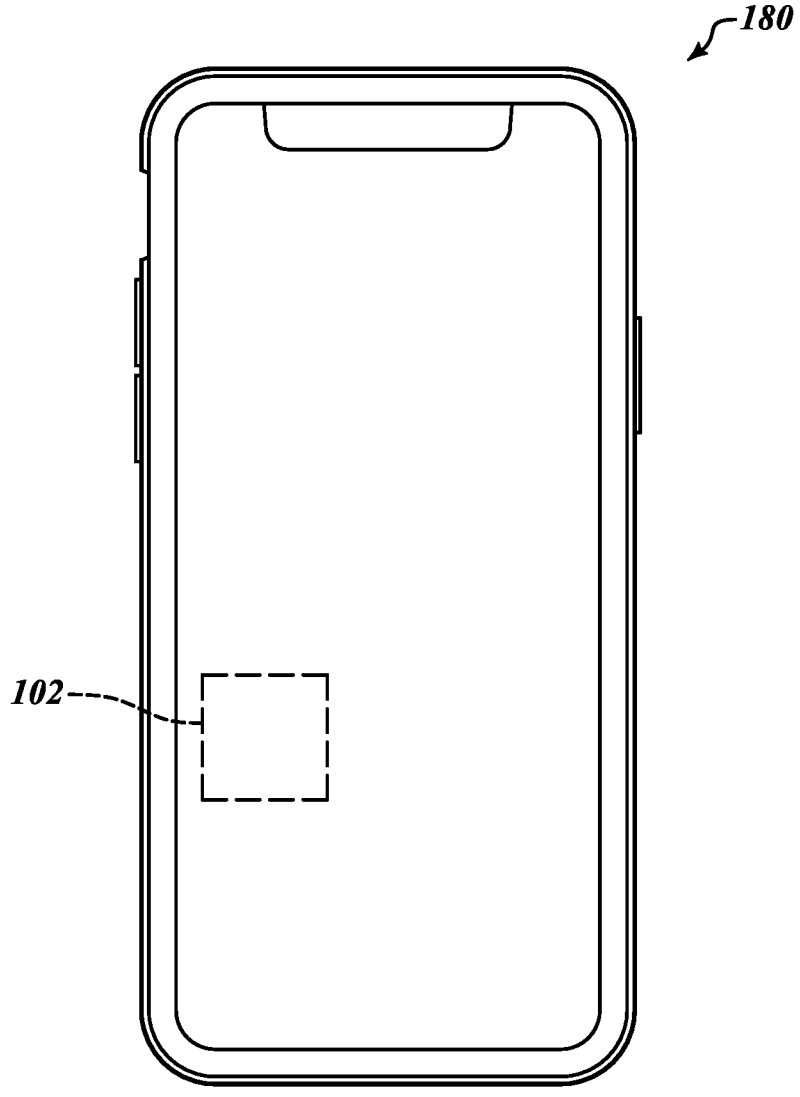
FIG. 6 is an illustration of a smart phone including a sensor module, in accordance with one embodiment.

FIG. 6 is an illustration of a smart phone 180, in accordance with one embodiment. The smart phone 180 is one example of an electronic device 100 of FIG. 1 or FIG. 4. A sensor module 102, shown in dashed lines, is mounted within the smart phone 180. The sensor module 102 may be positioned at a location that enables fluid communication such that the sensor module 102 can sense fluid pressure. The sensor module 102 can correspond to the sensor module 102 shown in previous figures.

FIG. 7 is a flow diagram of a method 700 for assembling the sensor module, in accordance with one embodiment. At 702, the method 700 includes mounting a MEMS pressure sensor on an organic substrate. At 704, the method 700 includes mounting a unitary lid on the organic substrate. The unitary lid includes a central elevated portion housing the MEMS pressure sensor, an aperture in the central elevated portion, and a flat flange extending from the central elevated portion to an edge of the organic substrate. At 706, the method 700 includes partially filling the central elevated portion with a sealing gel. At 708, the method 700 includes performing a first curing process of the sealing gel. At 710, the method 700 includes filling a remainder of the central elevated portion with the sealing gel after performing the first curing process. At 712, the method 700 includes performing a second curing process of the sealing gel.

Figure 8:
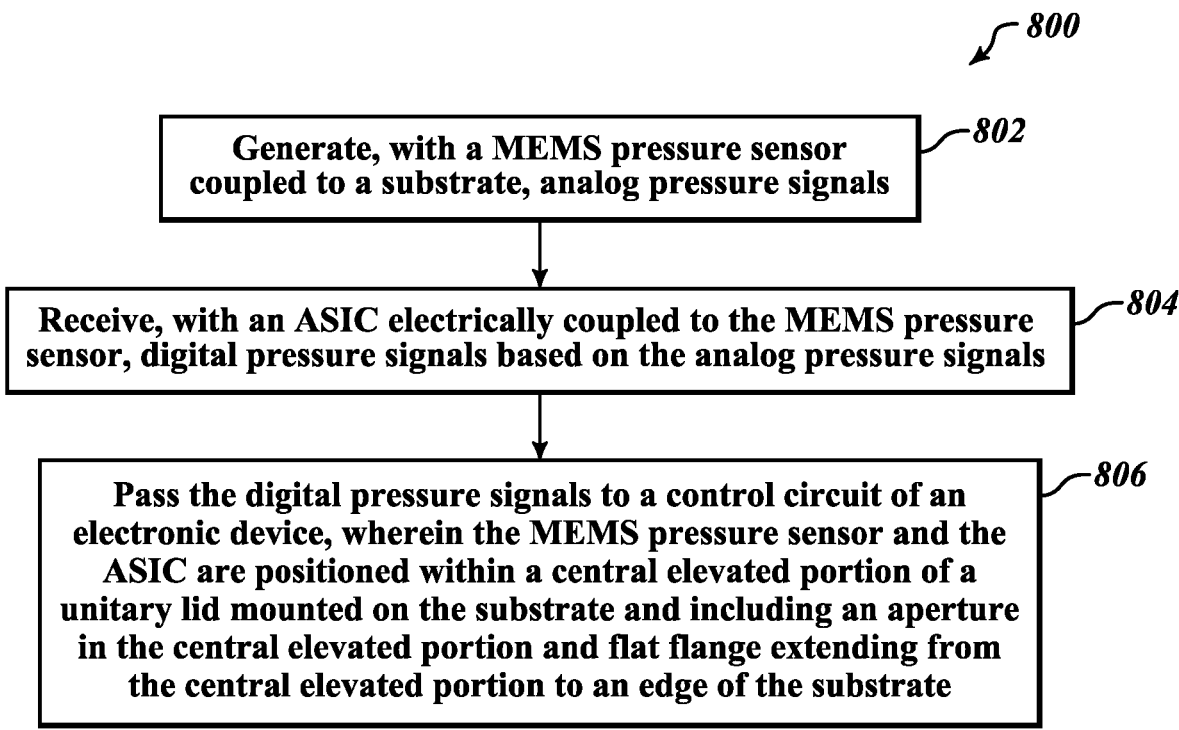
FIG. 8 is a flow diagram of a method for operating a sensor module, in accordance with one embodiment.

FIG. 8 is a flow diagram of a method 800, for operating an electronic device, in accordance with one embodiment. At 802, the method 800 includes generating, with a MEMS pressure sensor coupled to a substrate, analog pressure signals. At 804, the method 800 includes receiving, with an ASIC electrically coupled to the MEMS pressure sensor, digital pressure signals based on the analog pressure signals. At 806, the method 800 includes passing the digital pressure signals to a control circuit of an electronic device, wherein the MEMS pressure sensor and the ASIC are positioned within a central elevated portion of a unitary lid mounted on the substrate and including an aperture in the central elevated portion and a flat flange extending from the central elevated portion to an edge of the substrate.

In one embodiment, a sensor module includes a substrate, a MEMS pressure sensor mounted to the organic substrate, and a unitary lid mounted on the substrate. The unitary lid includes a central elevated portion housing the MEMS pressure sensor, an aperture in the central elevated portion, and a flat flange extending from the central elevated portion toward an edge of the organic substrate.

In one embodiment, the sensor module includes an ASIC electrically coupled to the MEMS pressure sensor and mounted on the organic substrate below the central elevated portion.

In one embodiment, the sensor module includes a sealing gel within central elevated portion.

In one embodiment, the unitary lid is stainless steel.

In one embodiment, the central elevated portion is less than 3 mm in height above the organic substrate.

In one embodiment, the central aperture is less than 1 mm in diameter.

In one embodiment, the organic substrate has a rectangular surface having four lateral edges, wherein the unitary flange extends to within 1 mm of each lateral edge.

In one embodiment, the flange has grooves in a top surface.

In one embodiment, the organic substrate has a circular top surface, wherein the flange has a circular edge.

In one embodiment, a method includes mounting a MEMS pressure sensor on an organic substrate and mounting a unitary lid on the organic substrate. The unitary lid includes a central elevated portion housing the MEMS pressure sensor, an aperture in the central elevated portion, and a flat flange extending from the central elevated portion to an edge of the organic substrate. The method includes partially filling the central elevated portion with a sealing gel, performing a first curing process of the sealing gel, filling a remainder of the central elevated portion with the sealing gel after performing the first curing process, and performing a second curing process of the sealing gel.

In one embodiment, mounting the unitary lid to the organic substrate includes gluing the flange to the organic substrate.

In one embodiment, the method includes mounting an ASIC to the organic substrate prior to mounting the unitary lid to the organic substrate.

In one embodiment, the method includes gluing a housing of an electronic device to a top surface of the flange.

In one embodiment, gluing the housing to the top surface of the flange includes gluing the housing to a grooved portion of the top surface.

In one embodiment, the unitary lid is stainless steel.

In one embodiment, the organic substrate has a rectangular surface having four lateral edges, wherein the unitary flange extends to within 1 mm of each lateral edge.

In one embodiment, a method includes generating, with a MEMS pressure sensor coupled to a substrate, analog pressure signals, receiving, with an ASIC electrically coupled to the MEMS pressure sensor, digital pressure signals based on the analog pressure signals, and passing the digital pressure signals to a control circuit of an electronic device. The MEMS pressure sensor and the ASIC are positioned within a central elevated portion of a unitary lid mounted on the substrate and including an aperture in the central elevated portion and a flat flange extending from the central elevated portion to an edge of the substrate.

In one embodiment, the electronic device is a smart watch.

In one embodiment, the electronic device is a smart phone.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor module, comprising:
an organic substrate;
a MEMS pressure sensor mounted to the substrate;
a unitary lid mounted on the substrate and including:
    a central elevated portion housing the MEMS pressure sensor;
    an aperture in the central elevated portion; and
    a flat flange extending from the central elevated portion toward an edge of the organic substrate, wherein a width of the flat flange from a first edge of the flat flange to an opposite edge of flat flange is at least five times as large as a height of the central elevated portion.

2. The sensor module of claim 1, comprising an ASIC electrically coupled to the MEMS pressure sensor and mounted on the substrate below the central elevated portion.

3. The sensor module of claim 1, comprising a sealing gel within central elevated portion.

4. The sensor module of claim 1, wherein the central elevated portion is less than 3 mm in height above the substrate.

5. The sensor module of claim 1, wherein the central aperture is less than 1 mm in diameter.

6. The sensor module of claim 1, wherein the substrate has a rectangular surface having four lateral edges, wherein the flat flange extends to within 0.2 mm of each lateral edge.

7. The sensor module of claim 1, wherein the flange has grooves in a top surface.

8. The sensor module of claim 1, wherein the organic substrate has a circular top surface, wherein the flange has a circular edge.

9. A method, comprising:
mounting a MEMS pressure sensor on a substrate;
mounting a unitary lid on the substrate, the unitary lid including:
    a central elevated portion housing the MEMS pressure sensor;
    an aperture in the central elevated portion; and
    a flat flange extending from the central elevated portion to an edge of the substrate, wherein a width of the flat flange from a first edge of the flat flange to an opposite edge of flat flange is at least five times as large as a height of the central elevated portion;
partially filling the central elevated portion with a sealing gel;
performing a first curing process of the sealing gel;
filling a remainder of the central elevated portion with the sealing gel after performing the first curing process; and
performing a second curing process of the sealing gel.

10. The method of claim 9, wherein mounting the unitary lid to the substrate includes gluing the flange to the substrate.

11. The method of claim 9, comprising mounting an ASIC to the substrate prior to mounting the unitary lid to the substrate.

12. The method of claim 9, comprising gluing a housing of an electronic device to a top surface of the flange.

13. The method of claim 12, wherein the gluing the housing to the top surface of the flange includes gluing the housing to a grooved portion of the top surface.

14. The method of claim 9, wherein the unitary lid is stainless steel.

15. The method of claim 9, wherein the central elevated portion is less than 3 mm in height above the substrate.

16. The method of claim 9, wherein the substrate has a rectangular surface having four lateral edges, wherein the flat flange extends to within 1 mm of each lateral edge.

17. A method, comprising:

generating, with a MEMS pressure sensor coupled to a substrate, analog pressure signals;

receiving, with an ASIC electrically coupled to the MEMS pressure sensor, digital pressure signals based on the analog pressure signals;

passing the digital pressure signals to a control circuit of an electronic device, wherein the MEMS pressure sensor and the ASIC are positioned within a central elevated portion of a unitary lid mounted on the substrate and including an aperture in the central elevated portion and a flat flange extending from the central elevated portion to an edge of the substrate, wherein a width of the flat flange from a first edge of the flat flange to an opposite edge of flat flange is at least five times as large as a height of the central elevated portion.

18. The method of claim 17, wherein the electronic device is a smart watch.

19. The method of claim 17, wherein the electronic device is a smart phone.

\* \* \* \* \*